Oct. 4, 1955 C. N. BERGSTROM Re. 24,065

HOLDING SEAL FOR CRANKCASE GASKETS

Original Filed June 11, 1949

INVENTOR
CARL N. BERGSTROM

BY C. D. Rickenbach

ATTORNEY

United States Patent Office

Re. 24,065
Reissued Oct. 4, 1955

24,065

HOLDING SEAL FOR CRANKCASE GASKETS

Carl N. Bergstrom, Portland, Oreg.

Original No. 2,639,832, dated May 26, 1953, Serial No. 98,495, June 11, 1949. Application for reissue August 19, 1953, Serial No. 375,313

5 Claims. (Cl. 218—29)

Matter enclosed in heavy brackets [ ] appears in the original patent but forms no part of this reissue specification; matter printed in italics indicates the additions made by reissue.

This invention relates generally to the automotive industry and particularly to a holding seal for crankcase gaskets.

The main object of this invention is to provide a means for facilitating the application of a crankcase and gasket to a motor base.

The second object is to insure the alignment of the holes in the crankcase and gasket and to protect the gasket around the bolt holes.

The third object is to insure a more perfect seal around the bolts and to render unnecessary the use of lock washers.

The fourth object is to utilize the aligning means as a screw retainer to hold the screws in position for the application of a speed wrench or a power driver.

These and other objects are accomplished in the manner set forth in the following specification as illustrated in the accompanying drawing, in which.

Like numbers of reference refer to the same or similar parts throughout the several views.

Figure 1:
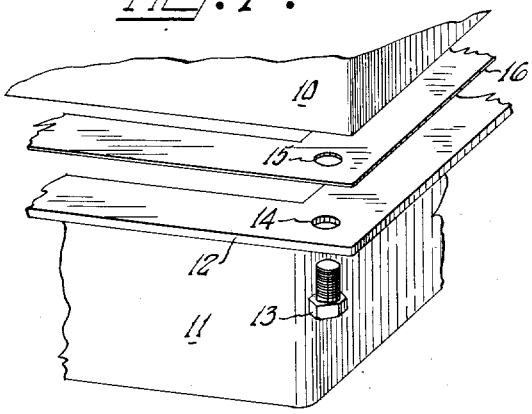
Fig. 1 is a fragmentary perspective view showing portions of the motor base, gasket and crankcase.
Figure 4:
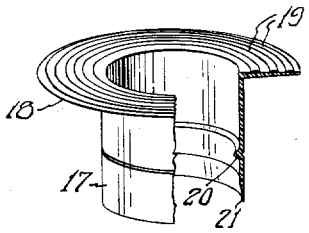
Fig. 4 is a perspective of the ferrule with parts broken away in section.

Referring in detail to the drawing, there is shown the lower portion 10 of a motor base to which is to be attached a crankcase 11 by means of its flange 12.

Around the flange 12 are disposed a plurality of screws 13 which pass through holes 14 in the flange 12 and through holes 15 in the cork or composition gasket 16, all of which are in common use.

There is always provided around the screws 13 a considerable amount of clearance space as the parts are interchangeable and a workman, having but two hands, has them very full when putting a crankcase and its gasket in position.

Shellac or other sticky seal is often used on both sides of the gasket and this tends to hold the gasket in place on the crankcase flange 12.

However, once the gasket touches the base 10, there is apt to be a shifting of the gasket 16 on the flange 12.

My device consists of a ferrule 17 of plastic materials [, such as the phenol derivatives], or lead, or other soft or ductile material.

The ferrule 17 has formed on one end a flange 18 provided with annular rings 19 which strengthen the flange and improve its holding and sealing action.

The ferrule 17 has formed in the side thereof, a bead 20 which may be continuous or merely broken or even single points or projections at two or more places around the ferrule 17. The end 21 is preferably flared to a thin edge to facilitate the insertion of the screw point 22.

In the use of this device, it is only required to mount the gasket 16 on the flange 12 and then drop a ferrule 17 into each pair of holes 14 and 15 until the flange 18 rests upon the gasket 16. Screws 17–A are now pushed into the ferrule ends 21 and held by means of the beads 20.

No difficulty will be encountered in starting the screws 17–A and then sending them home by means of a speed wrench or power driver.

Figure 3:
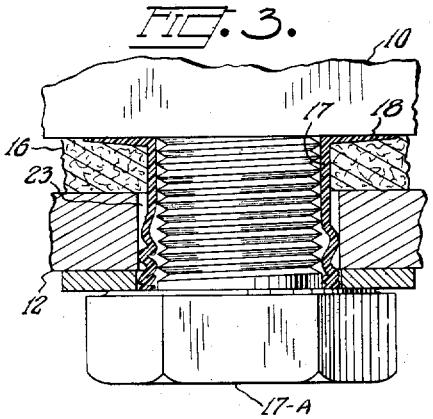
Fig. 3 is a view similar to Fig. 2, but showing the crankcase in position against the motor base with the bolt partially set.

The ferrule is flowed by the tightening action to the form shown in Fig. 3 in which the clearance is exaggerated. In practice the ferrule 17 fills up the clearance space 23 and flows around the threads of the screws 17–A.

Should the crankcase be removed, the gasket is more apt to come away intact with the crank case as it is held against it by the various ferrules.

Figure 2:
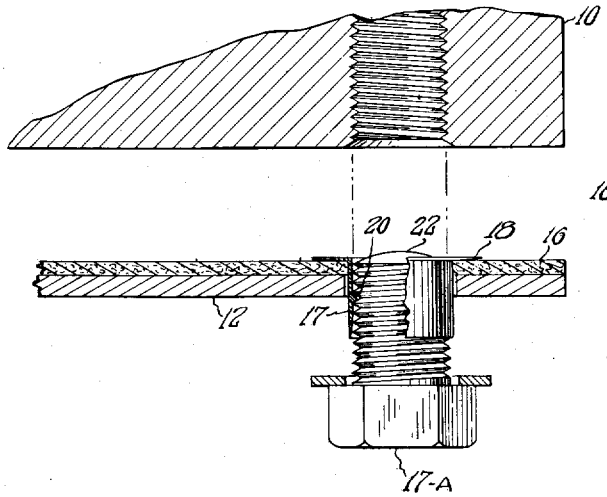
Fig. 2 is a fragmentary section showing the relation of the parts as the crankcase and gasket are being put into place.

*Referring to Figure 3 of the drawing, it is to be noted that the ferrule 17 has been deformed, as explained hereinbefore, to fill the space 23 and the grooves of the screw thread to form a fluid seal. In Figure 2 of the drawing it is to be noted that the ferrule extends downwardly a substantial distance below the flange 12. Thus, it will be understood that in the event the space 23 is less than that indicated in Figure 3 or, alternatively, if the ferrule is longer or thicker than indicated, the excess material of which the ferrule is formed will be forced outwardly between the bolt head 17–A and the crankcase flange. Thus, it will be understood that the length of the ferrule is not critical, it being required only that the ferrule extend through the combined thickness of the gasket and the flange a distance sufficient to result in its deformation to form a fluid seal when the bolt has been tightened. In other words, the length of the cylindrical portion 17 must be greater than the ultimate combined thickness of the compressed gasket and the flange, i. e. after the bolt has been tightened.*

*It will be further understood that the ferrule may be employed in the securing together of rigid elements, as compared with the resilient gasket 16. For example, a single metal plate may be considered equivalent to the combination of gasket 16 and flange 12. If such a plate is to be secured to a second member, such as the motor base 10, the ferrule is inserted through the plate to retain the screw prior to attachment to the base 10, and it is required that the ferrule 17 must be longer than the thickness of said plate in order for the ferrule to deform under the pressure of the tightened screw to form a fluid seal.*

*In practice, the ferrule is provided in sufficient length to accommodate a substantial range of thicknesses of such members 16 and 12. The ferrule may then be shortened to any desired length merely by cutting off the unwanted portion opposite the flange 18.*

I claim:

1. A ferrule for use in temporarily retaining a fastening member by its shank portion while fastening machine parts together by insertion and fixedly securing a fastening member in aligned openings in said machine parts, said ferrule comprising a cylindrical portion of deformable plastic resin having a bore which is tapered outwardly toward one end to provide an entering portion for the shank portion of the fastening member, the other end having an outwardly extending flange, a shank-engaging annular bead extending radially on the inner side of said ferrule bore for frictional engagement with the shank portion of the fastening member whereby the fastening member is temporarily retained by said ferrule upon insertion of *the* fastening member thereinto.

2. In combination; a first member of predetermined thickness adapted for being secured to a second member, a screw extending through said first member for threaded engagement with said second member, and a cylindrical ferrule of deformable plastic material mounted on the screw and tapering to a thin edge toward the head end of the screw and having a radial flange at its opposite end, said flange being disposed between said members with the cylindrical portion extending through said first member, and the length of the cylindrical portion of the ferrule being greater than the thickness of said first member, whereby when the screw is drawn up tight the cylindrical portion of said ferrule is deformed to form a seal about said screw, the cylindrical portion of the ferrule being provided with a thread engaging projection extending radially inwardly thereof whereby the screw is supported by the ferrule.

*3. In combination; a first member of predetermined thickness adapted for being secured to a second member, a screw extending through said first member for threaded engagement with said second member, and a cylindrical ferrule of deformable plastic material mounted on the screw and having a radial flange at one end, said flange being disposed between said members with the cylindrical portion extending through said first member, and the length of the cylindrical portion of the ferrule being greater than the thickness of said first member, whereby when the screw is drawn up tight the cylindrical portion of said ferrule is deformed to form a seal about said screw, the cylindrical portion of the ferrule being provided with a thread engaging projection extending radially inwardly thereof whereby the screw is supported by the ferrule.*

*4. In combination; a fastening member having a threaded shank and a headed end, first and second members having aligned openings therein for receiving the shank of the fastening member, a ferrule comprising a body of deformable plastic material having a hollow cylindrical shank-retaining portion and a radial flange on one end thereof, the cylindrical portion extending through the opening in the first member with but little space between its exterior face and the wall of said latter opening and with the flange interposed between the first member and second member, the cylindrical portion having a continuous circumference surrounding the fastening member shank and having a length greater than the thickness of the first member, the fastening member shank extending through the hollow cylindrical portion with its headed end at that end of the cylindrical portion of the ferrule that is opposite the flange thereof, the cylindrical portion of the ferrule frictionally engaging the fastening member shank whereby to secure the ferrule and fastening member in the first member, whereby when the fastening member shank is secured to the second member and the first and second members are drawn together by said fastening member the cylindrical portion of the ferrule is buckled into the opening in said first member to form a fluid seal between said shank and the opening in the first member.*

*5. In combination; a fastening member having a threaded shank and a headed end, first and second members having a gasket interposed therebetween and all having aligned openings therein for receiving the shank of the fastening member, a ferrule comprising a body of deformable plastic material having a hollow cylindrical shank-retaining portion and a radial flange on one end thereof, the cylindrical portion extending through the aligned openings in the gasket and first member with but little space between its exterior face and the wall of said latter aligned openings and with the flange interposed between the gasket and second member, the cylindrical portion having a continuous surface surrounding the fastening member shank and having a length greater than the combined thickness of the gasket and first member, the fastening member shank extending through the hollow cylindrical portion with its headed end at that end of the cylindrical portion of the ferrule that is opposite the flange thereof, the cylindrical portion of the ferrule frictionally engaging the fastening member shank whereby to secure the ferrule and fastening member in the aligned openings in the gasket and first member and to prevent displacement of said openings, whereby when the fastening member shank is secured to the second member and the said gasket and first and second members are drawn together by said fastening member the cylindrical portion of the ferrule is buckled into said aligned openings in the gasket and first member to form a fluid seal between said shank and the wall of said latter openings.*

References Cited in the file of this patent or the original patent

UNITED STATES PATENTS

| | | |
|---|---|---|
| 233,579 | Varlot | Oct. 19, 1880 |
| 813,575 | Nichols | Feb. 27, 1906 |
| 947,185 | McBean | Jan. 18, 1910 |
| 1,083,350 | Davis | Jan. 6, 1914 |
| 1,356,404 | Robinson | Oct. 19, 1920 |
| 1,515,996 | Buchanan | Nov. 18, 1924 |
| 1,862,320 | Ruef | June 7, 1932 |
| 1,873,894 | Kimbell | Aug. 23, 1932 |
| 1,959,607 | Anderson | May 22, 1934 |
| 2,030,088 | Young | Feb. 11, 1936 |
| 2,092,358 | Robertson | Sept. 7, 1937 |
| 2,150,080 | Rawlings | Mar. 17, 1939 |
| 2,159,346 | Welch | May 23, 1939 |
| 2,324,142 | Eklund | July 13, 1943 |
| 2,343,983 | Knowlton | Mar. 14, 1944 |
| 2,352,487 | McNamara | June 27, 1944 |
| 2,376,072 | Miller | May 15, 1945 |
| 2,425,209 | Snyder et al. | Aug. 5, 1947 |
| 2,491,085 | Burrows | Dec. 13, 1949 |

FOREIGN PATENTS

| | | |
|---|---|---|
| 126,301 | Germany | Nov. 15, 1900 |

OTHER REFERENCES

"Plastics for Present and Post-War Products," pub. by Product Engineering, September 1943, 288–S. R.